(12) United States Patent
Kim

(10) Patent No.: US 10,109,425 B2
(45) Date of Patent: Oct. 23, 2018

(54) MULTILAYER CAPACITOR, METHOD FOR MANUFACTURING THE SAME, AND ELECTRONIC DEVICE USING SAME

(71) Applicant: SAMSUNG ELECTRO-MECHANICS CO., LTD., Suwon-Si, Gyeonggi-Do (KR)

(72) Inventor: Sung Woo Kim, Suwon-Si (KR)

(73) Assignee: SAMSUNG ELECTRO-MECHANICS CO., LTD., Suwon-si, Gyeonggi-Do (KR)

(*) Notice: Subject to any disclaimer, the term of this patent is extended or adjusted under 35 U.S.C. 154(b) by 0 days.

(21) Appl. No.: 15/944,269

(22) Filed: Apr. 3, 2018

(65) Prior Publication Data

US 2018/0226195 A1  Aug. 9, 2018

Related U.S. Application Data

(63) Continuation of application No. 14/811,701, filed on Jul. 28, 2015.

(30) Foreign Application Priority Data

Jul. 28, 2014  (KR) .................. 10-2014-0095853

(51) Int. Cl.
*H01G 4/30* (2006.01)
*H01G 4/232* (2006.01)
*H01G 4/012* (2006.01)

(52) U.S. Cl.
CPC .............. *H01G 4/30* (2013.01); *H01G 4/012* (2013.01); *H01G 4/232* (2013.01)

(58) Field of Classification Search
CPC ........... H01G 4/30; H01G 4/232; H01G 4/012
See application file for complete search history.

(56) References Cited

U.S. PATENT DOCUMENTS 6,829,134 B2  12/2004  Yamauchi et al.
7,054,134 B2  5/2006  Togashi et al.
(Continued)

FOREIGN PATENT DOCUMENTS

JP  2004-319597 A  11/2004

OTHER PUBLICATIONS

Non-Final Office Action issued in related parent U.S. Appl. No. 14/811,701, dated Nov. 3, 2017.
(Continued)

*Primary Examiner* — Nathan Milakovich
(74) *Attorney, Agent, or Firm* — McDermott Will & Emery LLP

(57) ABSTRACT

Disclosed herein are a multilayer capacitor, a method for manufacturing the same, and an electronic device using the same. A multilayer capacitor including internal electrodes stacked in a dielectric so as to be spaced apart from each other, alternately connected to external electrodes formed on both sides of the dielectric, and formed so that width sizes of connection sections connected to the external electrodes are decreased as compared with those of overlapped sections overlapped with each other while vertically neighboring to each other in at least portions of a stacked structure is suggested. In addition, an electronic device using the multilayer capacitor and a method for manufacturing the multilayer capacitor are suggested.

6 Claims, 8 Drawing Sheets

(56) References Cited

U.S. PATENT DOCUMENTS

| | | | |
|---|---|---|---|
| 7,329,976 B2 | 2/2008 | Shirasu et al. | |
| 7,420,795 B2 | 9/2008 | Togashi et al. | |
| 7,466,535 B2 * | 12/2008 | Takashima | H01G 4/30 |
| | | | 361/306.1 |
| 7,646,585 B2 | 1/2010 | Aoki | |
| 7,667,950 B2 | 2/2010 | Togashi | |
| 7,936,554 B2 * | 5/2011 | Itamura | H01G 4/228 |
| | | | 361/303 |
| 8,120,891 B2 | 2/2012 | Takashima et al. | |
| 8,310,808 B2 | 11/2012 | Togashi | |
| 8,373,964 B2 | 2/2013 | Ahn et al. | |
| 8,400,753 B2 * | 3/2013 | Kim | H01G 4/01 |
| | | | 361/303 |
| 8,717,738 B2 | 5/2014 | Nishioka et al. | |
| 8,879,238 B2 | 11/2014 | Kim et al. | |
| 8,913,367 B2 | 12/2014 | Yoon et al. | |
| 8,964,353 B2 | 2/2015 | Kim et al. | |
| 8,988,853 B2 | 3/2015 | Kim | |
| 9,087,647 B2 | 7/2015 | Yoon et al. | |
| 9,123,474 B2 * | 9/2015 | Park | H01G 4/385 |
| 9,218,908 B2 | 12/2015 | Kim et al. | |
| 9,218,910 B2 | 12/2015 | Kim | |
| 9,293,259 B2 | 3/2016 | Kim et al. | |
| 9,324,496 B2 | 4/2016 | Lee et al. | |
| 9,424,990 B2 | 8/2016 | Lee et al. | |
| 2010/0271751 A1 | 10/2010 | Sasabayashi | |
| 2012/0268860 A1 | 10/2012 | Chung et al. | |
| 2014/0160620 A1 | 6/2014 | Kim et al. | |
| 2014/0345925 A1 | 11/2014 | Lee et al. | |
| 2014/0360764 A1 | 12/2014 | Kim et al. | |
| 2016/0240317 A1 | 8/2016 | Ro et al. | |

OTHER PUBLICATIONS

Non-Final Office Action issued in related parent U.S. Appl. No. 14/811,701, dated Jan. 17, 2017.

Final Office Action issued in related parent U.S. Appl. No. 14/811,701, dated May 17, 2017.

Final Office Action issued in related parent U.S. Appl. No. 14/811,701, dated Mar. 7, 2018.

* cited by examiner

MULTILAYER CAPACITOR, METHOD FOR MANUFACTURING THE SAME, AND ELECTRONIC DEVICE USING SAME

CROSS REFERENCE(S) TO RELATED APPLICATIONS

This application is a Continuation of U.S. patent application Ser. No. 14/811,701, filed Jul. 28, 2015, which claims the benefit under 35 U.S.C. Section [120, 119, 119(e)] of Korean Patent Application Serial No. 10-2014-0095853, entitled "Multilayer Capacitor, Method for Manufacturing the Same, and Electronic Device Using the Same" filed on Jul. 28, 2014, which is hereby incorporated by reference in its entirety into this application.

BACKGROUND OF THE INVENTION

1. Technical Field

The present disclosure relates to a multilayer capacitor, a method for manufacturing the same, and an electronic device using the same. More particularly, the present disclosure relates to a multilayer capacitor having a structure in which widths of connection parts of internal electrodes connected to external electrodes are decreased, a method for manufacturing the same, and an electronic device using the same.

2. Description of the Related Art

Multilayer capacitors such as multilayer ceramic capacitors (MLCCs), which are multilayer ceramic electronic components, have been gradually miniaturized and have been used in various electronic devices. In the case in which delamination, a crack, or the like, is generated in the multilayer capacitors in accordance with the gradual miniaturization of the multilayer capacitors, a problem may be caused in reliability of the electronic device. In addition, in the case in which moisture, ions, conductive foreign materials, and the like, permeate into elements through the delamination, the crack, or the like, reliability is degraded. Various methods for suppressing the delamination, the crack, or the like, have been suggested.

In a structure of the multilayer capacitor such as the MLCC, since ceramic dielectric sheets are stacked after internal electrode patterns having a predetermined thickness smaller than an area of the ceramic dielectric sheets are printed on the ceramic dielectric sheets, a step (thickness difference) is inevitably generated between an active region in which the internal electrode patterns are overlapped and margin regions that are in the vicinity of the active region. In a process of manufacturing the capacitor, when the ceramic green sheets on which the internal electrode patterns are printed are stacked and then compressed at the same pressure, the margin regions in which the step is present are bent while being compressed, such that a density thereof is increased.

However, in the structure of the multilayer capacitor according to the related art, in the case of margins in a length direction in which the internal electrodes are present every two layers, that is, L-margins, as compared with margins in a width direction in which the internal electrodes are not present, that is, W-margins, the internal electrodes having a high glass transition temperature (Tg) hinder bending of the margin regions at the time of compressing the ceramic green sheets. Therefore, in the multilayer capacitor having the structure according to the related art, connection sections of the internal electrodes connected to external electrodes act as resistors in improving a density in an L-margin region.

SUMMARY OF THE INVENTION

An object of the present disclosure is to provide a multilayer capacitor in which widths of connection sections of internal electrodes present every two layers and connected to external electrodes are decreased to increase bending in an L-margin region, a method for manufacturing the same, and an electronic device using the same.

According to an exemplary embodiment of the present disclosure, there is provided a multilayer capacitor including internal electrodes stacked in a dielectric so as to be spaced apart from each other, alternately connected to external electrodes formed on both sides of the dielectric, and formed so that width sizes of connection sections connected to the external electrodes are decreased as compared with those of overlapped sections overlapped with each other while vertically neighboring to each other in at least portions of a stacked structure.

For example, in one example, the width sizes of the connection sections may be decreased as compared with those of the overlapped sections in at least upper and lower regions of the stacked structure, for example, in an entire region of the stacked structure.

In addition, pattern removing regions formed by decreasing the width sizes of the connection sections may be formed so as not to be vertically continuously overlapped with each other. Here, the pattern removing regions may be alternately formed at both sides of the connection sections in a width direction.

In another example, the width sizes of the connection sections may be decreased as compared with those of the overlapped sections by ¼ or more to ⅔ or less.

The multilayer capacitor as described above may be used in an electronic device.

According to an exemplary embodiment of the present disclosure, there is provided a method for manufacturing a multilayer capacitor, including forming internal electrode patterns on a plurality of dielectric sheets, the internal electrode patterns being formed so that width sizes of connection sections that are to be connected to external electrodes are smaller than those of overlapped sections that are to be overlapped with each other so as to be spaced apart from each other while vertically neighboring to each other within a stacked dielectric on at least some of the dielectric sheets.

Here, in one example, the plurality of dielectric sheets may be stacked so that the width sizes of the connection sections are smaller than those of the overlapped sections in at least upper and lower layers of the stacked dielectric, for example, in an entire stacked structure of the stacked dielectric.

In one example, the plurality of dielectric sheets may be stacked so that pattern removing regions in which the dielectric sheets are exposed due to a decrease in the width sizes of the connection sections in the forming of the internal electrode patterns are not continuously overlapped with each other in a vertical direction, but have connection section regions of the internal electrode patterns interposed therebetween.

In addition, the internal electrode patterns may be formed so that the width sizes of the connection sections are in a range of approximately ⅓ to ¾ of those of the overlapped sections.

DESCRIPTION OF THE PREFERRED EMBODIMENTS

Figure 1:
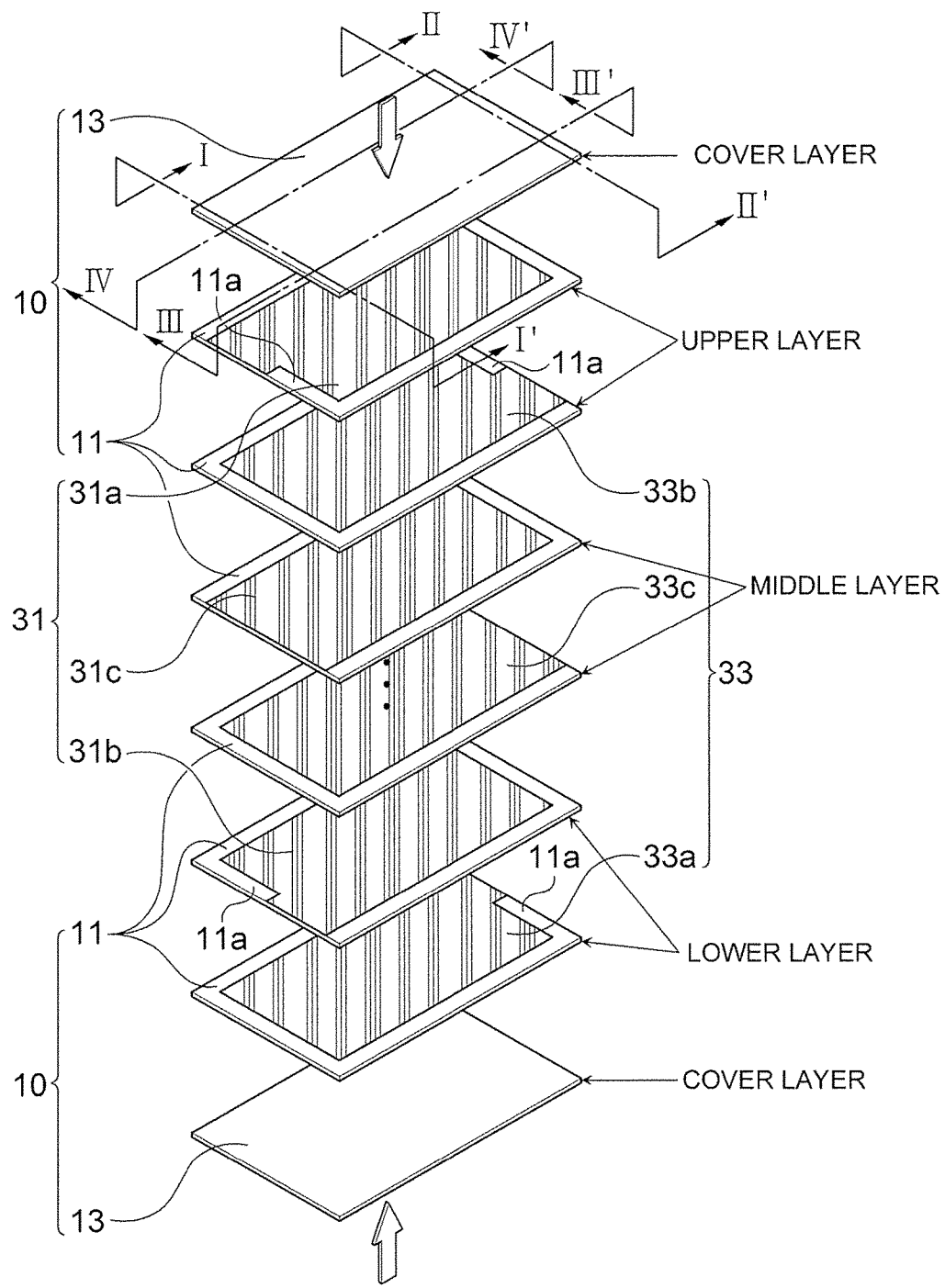
FIG. 1 is an exploded view schematically illustrating stacked portions of a dielectric and internal electrodes of a multilayer capacitor according to an exemplary embodiment of the present disclosure.

Exemplary embodiments of the present disclosure for accomplishing the above-mentioned objects will be described with reference to the accompanying drawings. In the description, the same reference numerals will be used to describe the same components of which a detailed description will be omitted in order to allow those skilled in the art to understand the present disclosure.

In the specification, it will be understood that unless a term such as 'directly' is not used in a connection, coupling, or disposition relationship between one component and another component, one component may be 'directly connected to', 'directly coupled to' or 'directly disposed to' another element or be connected to, coupled to, or disposed to another element, having the other element intervening therebetween.

Although a singular form is used in the present description, it may include a plural form as long as it is opposite to the concept of the present disclosure and is not contradictory in view of interpretation or is used as a clearly different meaning. It should be understood that "include", "have", "comprise", "be configured to include", and the like, used in the present description do not exclude presence or addition of one or more other characteristic, component, or a combination thereof.

The accompanying drawings referred in the present description may be examples for describing exemplary embodiments of the present disclosure. In the accompanying drawings, a shape, a size, a thickness, and the like, may be exaggerated in order to effectively describe technical characteristics.

A multilayer capacitor according to exemplary embodiments of the present disclosure will be described in detail with reference to the accompanying drawings. In the specification, the same reference numerals will be used in order to describe the same components throughout the accompanying drawings.

Figure 2A:
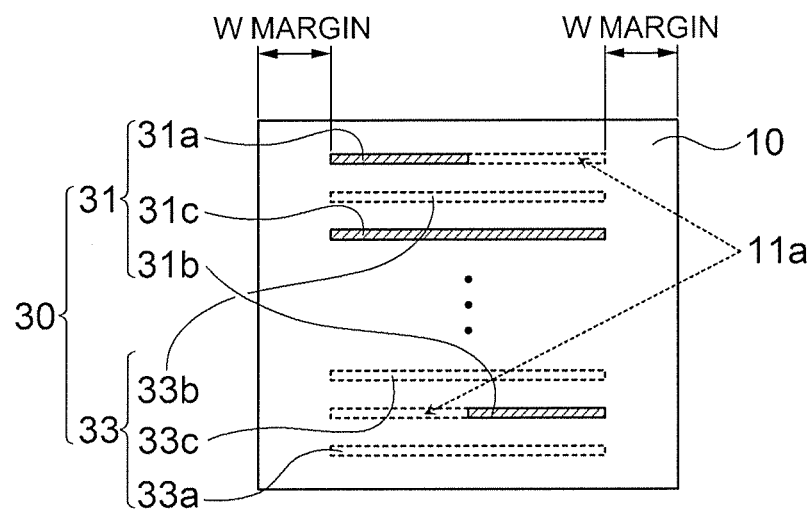
FIGS. 2A and 2B are schematic cross-sectional views taken along line I-I' and line II-II' of FIG. 1, respectively, in a state in which the dielectric and the internal electrodes of FIG. 1 are stacked and compressed.
Figure 2B:
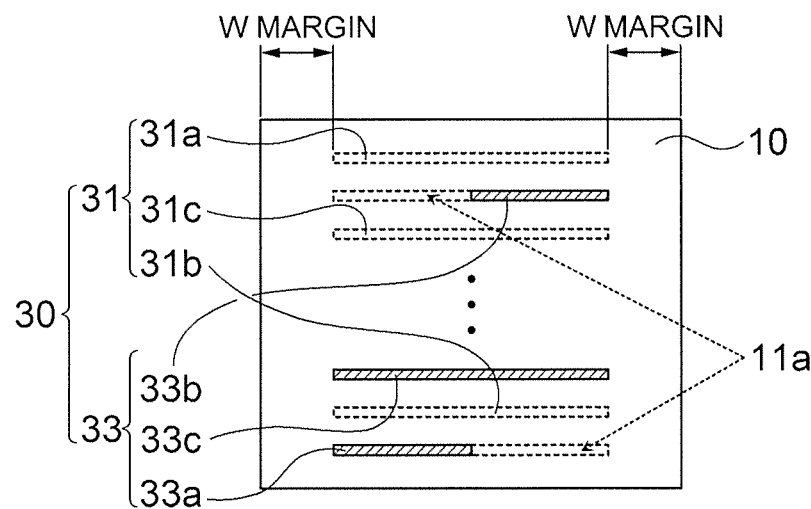
Figure 3A:
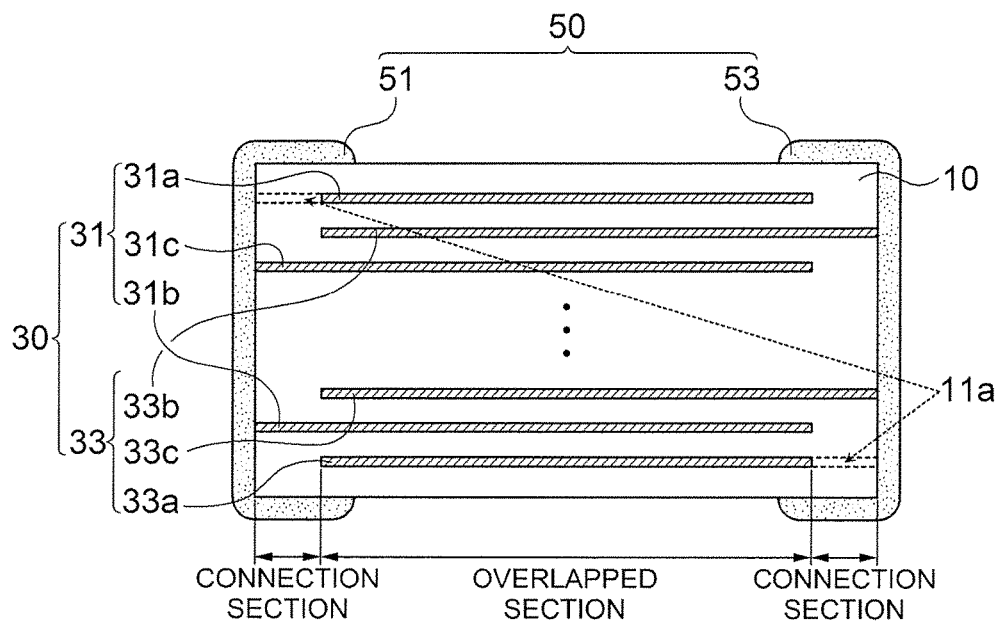
FIGS. 3A and 3B are schematic cross-sectional views taken along line III-III' and line IV-IV' of FIG. 1, respectively, in the multilayer capacitor according to the exemplary embodiment of the present disclosure.
Figure 3B:
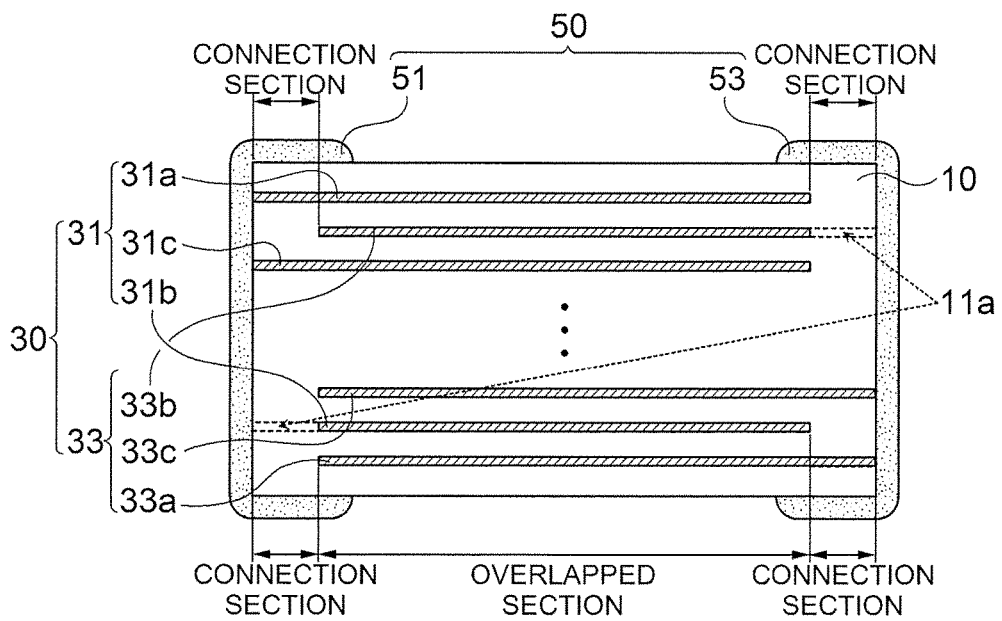
Figure 4:
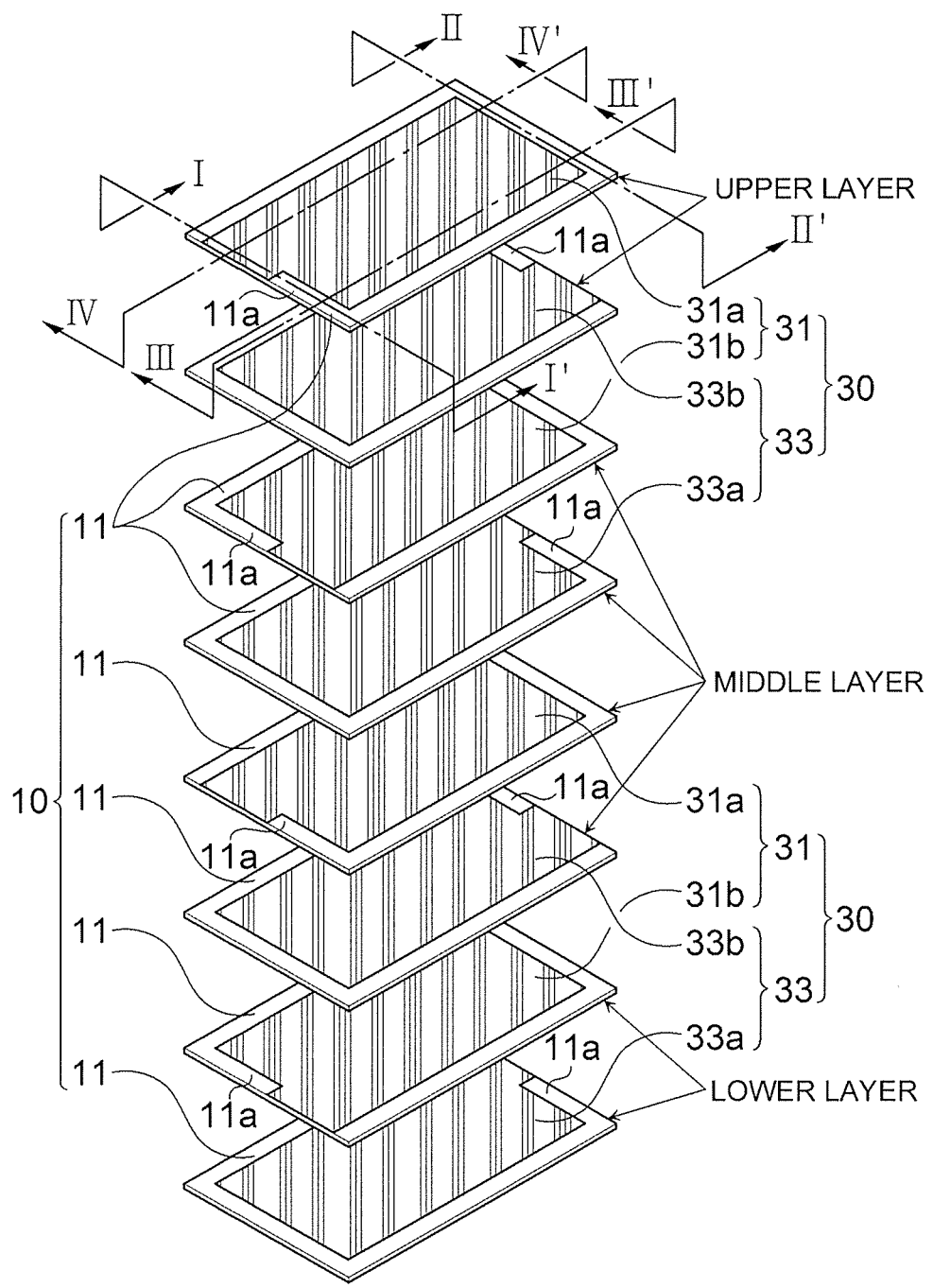
FIG. 4 is an exploded view schematically illustrating stacked portions of dielectrics and internal electrodes of a multilayer capacitor according to another exemplary embodiment of the present disclosure.
Figure 5A:
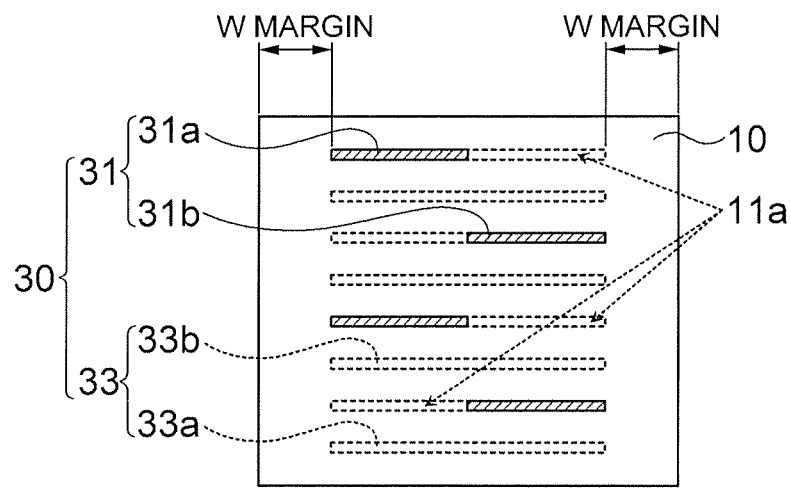
FIGS. 5A and 5B are schematic cross-sectional views taken along line I-I' and line II-II' of FIG. 4, respectively, in a state in which inner layers and cover layers of FIG. 4 are stacked and compressed.
Figure 5B:
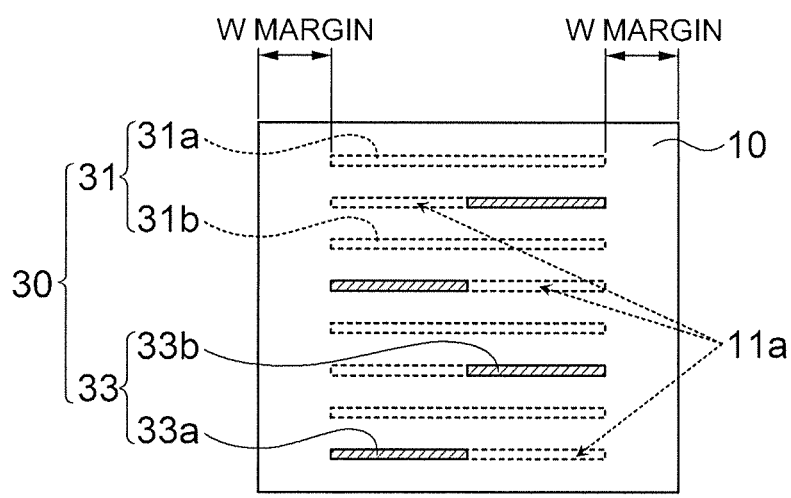
Figure 6A:
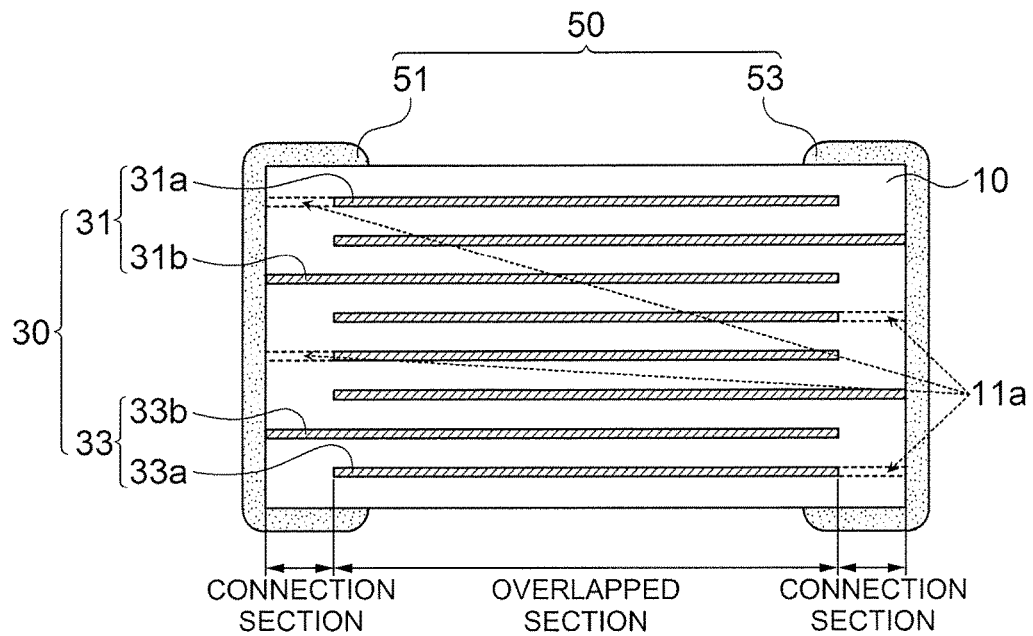
FIGS. 6A and 6B are schematic cross-sectional views taken along line III-III' and line IV-IV' of FIG. 4, respectively, in the multilayer capacitor according to another exemplary embodiment of the present disclosure.
Figure 6B:
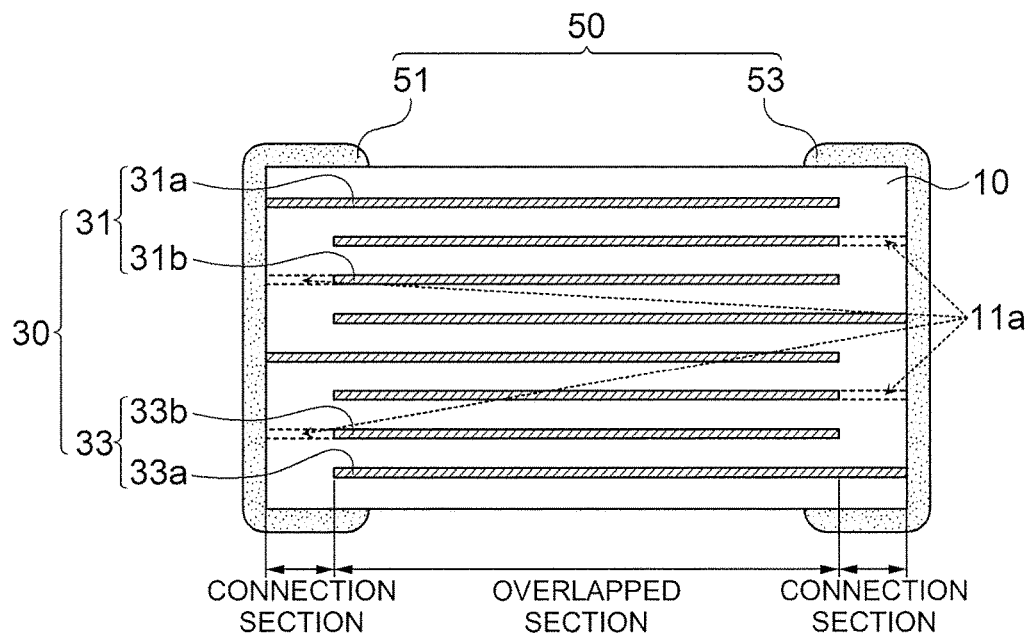

FIG. 1 is an exploded view schematically illustrating stacked portions of dielectrics and internal electrodes of a multilayer capacitor according to an exemplary embodiment of the present disclosure. Although not illustrated in FIG. 1, external electrodes 50 may cover both sides, in a length direction, of a dielectric 10 in which internal electrodes 30 are stacked to be spaced apart from each other. FIGS. 2A and 2B are schematic cross-sectional views taken along line I-I' and line II-II' of FIG. 1, respectively, in a state in which the dielectric and the internal electrodes of FIG. 1 are stacked and compressed. FIGS. 3A and 3B are schematic cross-sectional views taken along line III-III' and line IV-IV' of FIG. 1, respectively, in the multilayer capacitor according to the exemplary embodiment of the present disclosure. That is, FIGS. 3A and 3B schematically illustrate cross sections of the multilayer capacitor of FIG. 1 to which the external electrodes 50 are added, taken along line III-III' and line IV-IV' of FIG. 1, respectively. In addition, FIG. 4 is an exploded view schematically illustrating stacked portions of dielectrics and internal electrodes of a multilayer capacitor according to another exemplary embodiment of the present disclosure. Although the external electrodes 50 are not illustrated in FIG. 4, similar to FIG. 1, and dielectric cover layers 13 illustrated in FIG. 1 are not illustrated in FIG. 4, the multilayer capacitor according to the exemplary embodiment of the present disclosure includes the dielectric cover layers 13 provided in the dielectric and includes the external electrodes 50. FIGS. 5A and 5B are schematic cross-sectional views taken along line I-I' and line II-II' of FIG. 4, respectively, in a state in which inner layers that are illustrated in FIG. 4 and the dielectric cover layers 13 that are not illustrated in FIG. 4 are stacked and compressed. FIGS. 6A and 6B are schematic cross-sectional views taken along line III-III' and line IV-IV' of FIG. 4, respectively, in the multilayer capacitor according to another exemplary embodiment of the present disclosure (including the dielectric cover layers 13 and the external electrodes 50).

Referring to FIGS. 1 to 6B, the multilayer capacitor according to the exemplary embodiment of the present disclosure is configured to include the dielectric 10, the external electrodes 50 and the internal electrodes 30. In FIGS. 1, 2A, 2B, 4, 5A, and 5B, the external electrodes 50 are not illustrated. The respective components will be described below in detail.

Referring to FIGS. 1 to 6B, the dielectric 10 forms a body part of the multilayer capacitor. For example, referring to FIG. 1 and/or FIG. 4, the dielectric 10 may be formed by stacking dielectric sheets 11 on which internal electrode patterns 31 and 33 are formed. A material of the dielectric 10 or the dielectric sheet 11 for forming the dielectric 10, for example, a ceramic material used for a capacitor may be used.

Next, referring to FIGS. 3A, 3B, 6A, and/or 6B, the external electrodes 50: 51 and 53 may be formed on both sides of the dielectric 10, respectively. For example, referring to FIGS. 3A, 3B, 6A, and/or 6B, the external electrodes 50: 51 and 53 may cover both side end portions of the dielectric 10, respectively. That is, the external electrodes 50: 51 and 53 may be spaced apart from each other while covering both end surfaces of the dielectric 10 and circumferences of both end surfaces of the dielectric 10. Alternatively, although not illustrated, the external electrodes may have a structure in which they are vertically formed from an upper surface or a lower surface of the dielectric 10 into the dielectric 10. As a material of the external electrodes 50: 51 and 53, a metal used as an electrode material of the capacitor is used.

Next, the internal electrodes 30 of the multilayer capacitor will be described with reference to FIGS. 1 to 6. The internal electrodes 30 of the multilayer capacitor are stacked in the dielectric 10 so as to be spaced apart from each other. Here, referring to FIGS. 3A, 3B, 6A, and/or 6B, the stacked internal electrodes 30 or the internal electrode patterns 31 and 33 are alternately connected to the external electrodes 50: 51 and 53 formed on both sides of the dielectric 10. For example, as the dielectric sheets 11 are stacked and compressed, the internal electrode patterns 31 and 33 formed on the dielectric sheets 11 illustrated in FIG. 1 and/or FIG. 4 may be alternately exposed to both end surfaces of the stacked dielectric 10 to thereby be electrically connected to the external electrodes 50: 51 and 53. Alternatively, although not illustrated, the internal electrode patterns 31 and 33 may be formed so that connection sections alternately protrude from the respective dielectric sheets 10 to both sides, and the internal electrodes 30 may be formed so that the external electrodes (not illustrated) vertically formed from both sides of the upper surface or the lower surface of the dielectric 10 in which the respective dielectric sheets 11 are stacked into the dielectric 10 and the connection sections are alternately electrically connected to each other. In FIGS. 1 to 6B, internal electrode patterns having a reference numeral 31 and internal electrode patterns having a reference numeral 33 are alternately connected to an external electrode having a reference numeral 51 and an external electrode having a reference numeral 53. Different types of internal electrode patterns having reference numerals 31a and 31b are connected to the external electrode having the reference numeral 51, and different types of internal electrode patterns having reference numerals 33a and 33b are connected to the external electrode having the reference numeral 53.

For example, the internal electrode patterns 31 and 33 formed on individual dielectric sheets 11 may be divided into overlapped sections corresponding to regions in which they are overlapped with each other in a state in which they are vertically spaced apart from each other at the time of being stacked and connection sections corresponding to remaining portions except for the overlapped sections, that is, portions connected to the external electrodes 50. Here, the overlapped section and the connection section are integrated with each other as one pattern.

Here, the internal electrodes 30 of the multilayer capacitor are formed so that width sizes of the connection sections connected to the external electrodes 50 are decreased as compared with width sizes of the overlapped sections overlapped with each other while vertically neighboring to each other in the stacked structure, in at least portions of a stacked structure in which the internal electrodes 30 are stacked in the dielectric 10. In the present disclosure, the width size of the connection section means a width size in a width direction of the connection section that is the same as a width direction of the dielectric 10. For example, referring to FIGS. 1 and 4, the width sizes of the connection sections connected to the external electrodes 50 may be decreased as compared with the width sizes of the overlapped sections, in at least upper and lower regions of the stacked structure. Although not illustrated, the width sizes of the connection sections connected to the external electrodes 50 may also be decreased as compared with the width sizes of the over- lapped sections, in any one of upper, middle, and lower regions of the stacked structure or only any one layer within any one of the upper, middle, and lower regions.

In FIGS. 1 to 6B, the internal electrode patterns having the reference numerals 31a, 31b, 33a, and 33b are patterns of which the width sizes of the connection sections are smaller than those of the overlapped sections, and the internal electrode patterns having reference numerals 31c and 33c are patterns that are the same as the patterns according to the related art.

In the related art, internal electrodes or the internal electrode patterns are formed so that the width sizes of the connection sections and the overlapped sections of the internal electrodes or the internal electrode patterns, that is, the width sizes thereof in the direction coinciding with the width direction of the dielectric 10 are the same as each other. Here, since the connection sections of the internal electrodes are formed every two layers in L-margin regions, in the related art, bending of the L-margin region are hindered as compared with both side sections in the width direction in which the internal electrodes are not present, that is, W-margin regions. That is, in the L-margin regions according to the related art, at the time of stacking, compressing, and/or contracting the dielectric sheets on which the internal electrodes are formed, the internal electrodes serve as a pillar or a core to hinder the bending of the margins, which hinders improvement in a density of the L-margin regions.

However, since the width sizes of the connection sections are decreased as compared with the width sizes of the overlapped sections in the exemplary embodiment of the present disclosure unlike the related art, steps are increased in the L-margin regions of the dielectric 10 corresponding to the connection sections and the bending in the step portions is increased by the stacking, compressing, and/or contracting, thereby making it possible to promote the improvement of the density. In addition, adhesion between the dielectric sheets 11 is improved in pattern removing regions in which the widths of the connection sections are decreased, such that improvement of adhesion in the entire stacked structure may be expected. In the present exemplary embodiment, the bending in the L-margin regions is smaller than that in the width margins in which the internal electrode patterns are not present, that is, the W-margin regions, but is increased as compared with the related art, thereby making it possible to promote the improvement of the density. In addition, since the density and/or the adhesion of the stacked structure are improved through the increase in the bending in the L-margin regions, mechanical strength of the multilayer capacitor may be improved, thereby making it possible to promote improvement of reliability.

For example, in one example, the width sizes of the connection sections connected to the external electrodes 50 may be decreased as compared with the width sizes of the overlapped sections, in at least the upper and lower regions (upper and middle layers in FIGS. 1 and 4) of the stacked structure. Here, each of the upper and lower regions (the upper and middle layers in FIGS. 1 and 4) of the stacked structure may be one internal electrode pattern layer 31 or 33 or two or more internal electrode pattern layers 31 and 33 that are continuously stacked. FIG. 1 illustrates the case in which each of the upper and lower regions of the stacked structure is configured of two internal electrode pattern layers 31a and 33b and 31b and 33a. In the middle region (a middle layer of FIG. 1) except for the upper and lower regions of the stacked structure, the width sizes of the connection sections may be the same as those of the overlapped sections, similar to the related art, as illustrated in FIG. 1. According to the present exemplary embodiment, the widths of the connection sections of the internal electrodes 30 formed every two layers are decreased in the L-margin regions of at least the upper and lower regions of the stacked structure, such that an area hindering the bending of the L-margin regions at the time of the compressing is decreased. Therefore, the bending in the L-margin regions is increased, thereby making it possible to promote the improvement of the density.

For example, as illustrated in FIG. 4, the internal electrodes 30 may be formed so that the width sizes of the connection sections are decreased as compared with the width sizes of the overlapped sections in the middle region of the stacked structure as well as the upper and lower regions (the upper and lower layers of FIG. 4) of the stacked structure, that is, in the entire regions of the sacked structure. FIG. 4 illustrates the case in which the width sizes of the connection sections are decreased as compared with the width sizes of the overlapped sections in each of the internal electrode pattern layers 31 and 33 in the entire stacked region of the internal electrode pattern layers 31 and 33.

In another example, the pattern removing regions 11a formed by decreasing the widths of the connection sections connected to the external electrodes 50 may be formed on at least two layers in the stacked structure. Here, the pattern removing regions 11a may be formed so as not to be vertically continuously overlapped with each other in the connection sections connected to the external electrodes 50, that is, the L-margin regions, in the stacked structure. The pattern removing regions 11a may be formed on the dielectric sheets forming the respective layers before the dielectric 10 is stacked and compressed by decreasing portions of the internal electrode patterns so that the dielectric sheets 11 are exposed in the connection section regions. In the exemplary embodiment of the present disclosure, since the pattern removing regions 11a are formed so as not to be vertically continuously overlapped with each other, the steps in the L-margin regions of the dielectric 10 are not increased at only one side in the width direction, but are increased at both sides in the width direction, such that the bending is increased by the stacking, the compressing, and/or contracting in the step portions, thereby making it possible to promote uniform improvement of the density. In addition, the pattern removing regions 11a are not continuously overlapped with each other, such that adhesion between the dielectric sheets 11 are uniformly improved at both sides of the connection sections in the width direction, thereby making it possible to expect that the adhesion of the entire stacked structure will be improved. In addition, in the L-margin regions, the density is uniformly improved without being biased toward one side in the width direction, and the adhesion of the stacked structure is uniformly improved, thereby making it possible to improve the mechanical strength and the reliability of the multilayer capacitor.

For example, in one example, the connection sections of the internal electrodes 30 formed every two layers are not vertically continuously disposed, but may be alternately disposed at one side and the other side in the width direction. Therefore, the bending in the L-margin regions may be formed so as not to be biased toward one side in the width direction.

For example, the pattern removing regions 11a may be alternately formed at both sides of the connection sections in the width direction, and may not be overlapped with each other.

In addition, in one example, the width sizes of the connection sections of the internal electrodes may be decreased as compared with those of the overlapped sections by approximately ¼ or more to ⅔ or less. For example, the width sizes of the connection sections may be decreased as compared with those of the overlapped sections by approximately ½. Therefore, in the dielectric region in which the width sizes of the connection sections are decreased, areas of the connection sections of the internal electrodes 30 are decreased to ½ to increase the bending in the L-margin regions at the time of the stacking and the compressing, thereby making it possible to promote the improvement of the density and the mechanical strength. For example, also in this case, the pattern removing regions 11a may be formed so as not to be vertically continuously overlapped with each other in the connection sections connected to the external electrodes 50, that is, the L-margin regions, in the stacked structure.

The multilayer capacitor according to any one of the exemplary embodiments of the present disclosure described above is used in an electronic device (not illustrated). Here, an electronic device according to another exemplary embodiment of the present disclosure includes the multilayer capacitor according to any one of the exemplary embodiment of the present disclosure described above. Here, the mechanical strength and the reliability of the multilayer capacitor used in the electronic device are increased due to the improvement of the density in the L-margin regions as described above, thereby making it possible to promote an increase in a lifespan of the electronic device.

Next, a method for manufacturing a multilayer capacitor according to an exemplary embodiment of the present disclosure will be described in detail. Here, a description will be provided with reference to the multilayer capacitors according to the exemplary embodiments of the present disclosure described above and FIGS. 1 to 6B. Therefore, overlapped descriptions will be omitted.

Figure 7:
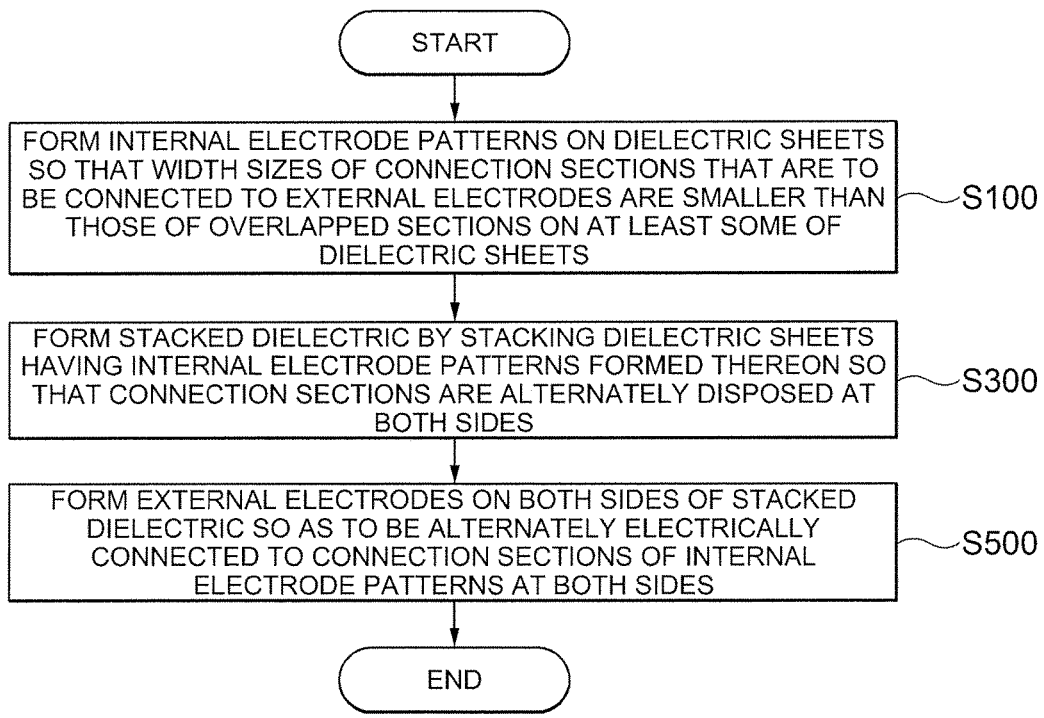
FIG. 7 is a flow chart schematically describing a method for manufacturing a multilayer capacitor according to an exemplary embodiment of the present disclosure.
Figure 8:
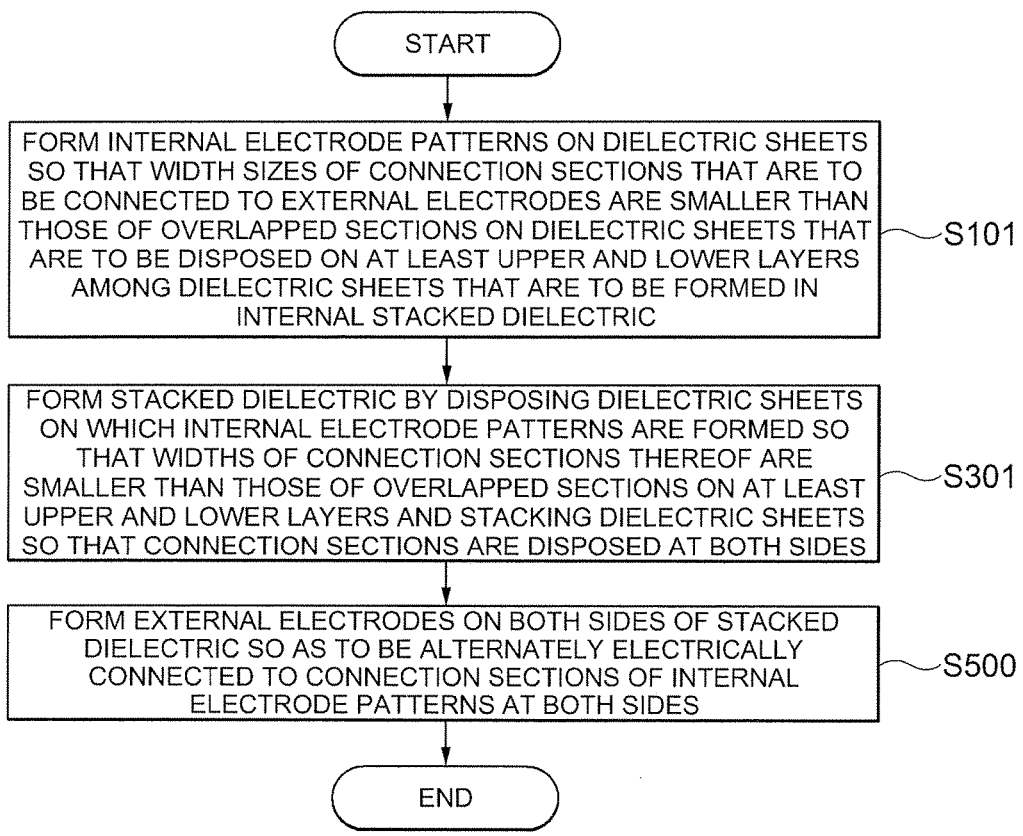
FIG. 8 is a flow chart schematically describing a method for manufacturing a multilayer capacitor according to another exemplary embodiment of the present disclosure.

FIG. 7 is a flow chart schematically describing a method for manufacturing a multilayer capacitor according to an exemplary embodiment of the present disclosure; and FIG. 8 is a flow chart schematically describing a method for manufacturing a multilayer capacitor according to another exemplary embodiment of the present disclosure.

Referring to FIG. 7 and/or FIG. 8, the method for manufacturing a multilayer capacitor according to an exemplary embodiment of the present disclosure includes forming internal electrode patterns (S100 or S101), forming a stacked dielectric (S300 or S301), and forming external electrodes (S500). The respective processes will be described in detail.

First, in the forming (S100 or S101) of the internal electrode patterns, the internal electrode patterns 31 and 33 are formed on a plurality of dielectric sheets 11, respectively. For example, the internal electrode patterns 31 and 33 may be formed by printing patterns on the dielectric sheets 11 or using other methods. In the forming (S100 or S101) of the internal electrode patterns, the internal electrode patterns 31a, 31b, 33a, and 33b are formed so that the width sides of the connection sections are smaller than those of the overlapped sections. Here, the connection sections are sections connected to the external electrodes 50: 51 and 53 in the forming (S500) of the external electrodes, and the overlapped sections are sections overlapped with each other so as to be spaced apart from each other while vertically neighboring to each other within the stacked dielectric 10 stacked in the forming (S300 or S301) of the stacked dielectric. That is, the internal electrode patterns 31 and 33 formed on the dielectric sheets 11 may be divided into the overlapped sections and the connection sections, wherein the connection sections are sections except for the overlapped sections. Here, the connection section and the overlapped section are formed integrally with each other as one pattern.

Here, the forming (S100) of the internal electrode patterns will be described. The internal electrode patterns 31a, 31b, 33a, and 33b are formed on at least some of the dielectric sheets 11 so that the width sides of the connection sections are smaller than those of the overlapped sections. That is, the internal electrode patterns 31a, 31b, 33a, and 33b of which the width sizes of the connection sections are decreased are formed on at least some of the dielectric sheets 11. Then, in S300, the dielectric sheets 11 are stacked, such that the width sizes of the connection sections of the internal electrode patterns are smaller than those of the overlapped sections in at least portions of the stacked dielectric 10 formed by stacking the plurality of dielectric sheets 11.

For example, in one example, referring to FIG. 8, in the forming (S101) of the internal electrode patterns, the internal electrode patterns 31a, 31b, 33a, and 33b may be formed so that the width sizes of the connection sections are smaller than those of the overlapped sections on the dielectric sheets 11 forming at least the upper and lower layers of the dielectric sheets 11 that are to form the stacked dielectric 10. For example, as illustrated in FIG. 1, the internal electrode patterns 31a, 31b, 33a, and 33b may be formed on the upper and lower layers of the dielectric sheets 11 on which the internal electrode patterns 31 and 33 are formed so that the width sizes of the connection sections are smaller than those of the overlapped sections. In another example, as illustrated in FIG. 4, the internal electrode patterns 31a, 31b, 33a, and 33b may be formed on all the dielectric sheets 11 on which the internal electrode patterns 31 and 33 are formed so that the width sizes of the connection sections are smaller than those of the overlapped sections.

For example, in one example, in the forming (S101 or S101) of the internal electrode patterns, the internal electrode patterns 31a, 31b, 33a, and 33b may be formed so that the width sizes of the connection sections are in a range of approximately ⅓ to ¾ of those of the overlapped sections or are approximately ½ of those of the overlapped sections. In other words, the internal electrode patterns 31a, 31b, 33a, and 33b may be formed so that the width sizes of the connection sections are decreased as compared with those of the overlapped sections by approximately ¼ to ⅔ or approximately ½.

Next, referring to FIGS. 7 and 8, in the forming (S300 or S301) of the stacked dielectric, the stacked dielectric 10 is formed by stacking the plurality of dielectric sheets 11 on which the internal electrode patterns 31 and 33 are formed. Here, the stacked dielectric 10 is formed by stacking the plurality of dielectric sheets 11 so that the connection sections of the internal electrode patterns 31 and 33 are alternately disposed at both sides. In the present process, the stacked dielectric 10 is formed by stacking and compressing the plurality of dielectric sheets 11. In order to increase the bending in the L-margin regions at the time of stacking and compressing the plurality of dielectric sheets 11, the internal electrode patterns 31a, 31b, 33a, and 33b are formed so that the width sizes of the connection sections are smaller than those of the overlapped sections in the forming (S100 or S101) of the internal electrode patterns. At the time of stacking the dielectric sheets 11, the dielectric cover layers 13 on which the internal electrode patterns are not formed are stacked together with the dielectric layers 11.

For example, after the plurality of internal electrode patterns 31 and 33 are printed on the dielectric sheets 11 the plurality of dielectric sheets 11 on which the plurality of internal electrode patterns are formed are stacked and compressed, a stacked body may be cut in a unit of individual stacked dielectrics 10 before the forming (S500) of the external electrodes. That is, in the method for manufacturing a multilayer capacitor according to the present exemplary embodiment, the stacked dielectric 10 is used as the meaning including a dielectric 10 in a state in which the plurality of dielectric sheets 11 having the plurality of internal electrode patterns formed thereon, respectively, are stacked and compressed and are then cut in an individual unit as well as a dielectric 10 in a state in which the plurality of dielectric sheets 11 are simply stacked and compressed.

For example, referring to FIG. 7, in the forming (S300) of the stacked dielectric, the stacked dielectric 10 is formed by stacking the dielectric sheets 11 on which the internal electrode patterns 31a, 31b, 33a, and 33b are formed so that the width sizes of the connection sections thereof are smaller than those of the overlapped section on at least some of the layers of the stacked dielectric 10.

For example, in one example referring to FIG. 8, in the forming (S301) of the stacked dielectric, the stacked dielectric 10 is formed by stacking the dielectric sheets 11 on which the internal electrode patterns 31a, 31b, 33a, and 33b are formed so that the width sizes of the connection sections thereof are smaller than those of the overlapped section so as to be disposed on each of at least the upper and lower layers of the stacked dielectric 10. For example, the dielectric sheets 11 on which the internal electrode patterns 31a, 31b, 33a, and 33b are formed so that the width sizes of the connection sections thereof are smaller than those of the overlapped section may be stacked so that at least two layers thereof are continuously disposed on each of at least the upper and lower layers of the stacked dielectric 10.

Here, although not directly illustrated, referring to FIG. 4, in one example, in the forming of the stacked dielectric, the plurality dielectric sheets 11 may be stacked so that the width sizes of the connection sections are smaller than those of the overlapped section in the entire stacked structure of the stacked dielectric 10.

Referring to FIG. 1 and/or FIG. 4, in one example, in the forming (S300 or S301) of the stacked dielectric, the plurality of dielectric sheets 11 may be stacked so that the pattern removing regions 11a in which the dielectric sheets 11 are exposed due to the decrease in the width sizes of the connection sections in the forming (S100 or S101) of the internal electrode patterns are not continuously overlapped with each other in a vertical direction, but have connection section regions of the internal electrode patterns interposed therebetween.

For example, the pattern removing regions 11a are alternately formed at both sides of the connection sections in the width direction in the forming (S100 or S101) of the internal electrode patterns, such that the pattern removing regions 11a may not be overlapped with each other at the time of stacking the dielectric sheets in the forming (S300 or S301) of the stacked dielectric.

Next, referring to FIGS. 7 and 8, in the forming (S500) of the external electrodes, the external electrodes 50 are formed on both sides of the stacked dielectric 10 so as to be alternately electrically connected, at both sides, to the connection sections of the internal electrode patterns 31 and 33 formed in the stacked dielectric 10. For example, the external electrodes 10 may be formed so as to cover both end portions of the stacked dielectric 10. Alternatively, although not illustrated, the external electrodes may be formed vertically from both sides of the upper or lower surface of the stacked dielectric 10 into the stacked dielectric 10 to thereby be alternately electrically connected to the internal electrode patterns 31 and 33 at both sides.

According to the exemplary embodiment of the present disclosure, in the multilayer capacitor, the widths of the connection sections of the internal electrodes present every two layers and connected to the external electrodes are decreased, thereby making it possible to increase the bending of the L-margin regions.

Therefore, the bending in the L-margin regions is increased, thereby making it possible to promote the improvement of the density and improve the mechanical strength of the multilayer capacitor due to the improvement of the density. As a result, the improvement of the reliability may be promoted.

Various effects according to various exemplary embodiments of the present disclosure may be understood and derived by those skilled in the art from a combination of components in each exemplary embodiment even though they are not directly mentioned.

The accompanying drawings and the above-mentioned exemplary embodiments have been illustratively provided in order to assist in the understanding of those skilled in the art to which the present disclosure pertains rather than limiting a scope of the present disclosure. In addition, exemplary embodiments according to a combination of the above-mentioned configurations may be obviously implemented by those skilled in the art. Therefore, various exemplary embodiments of the present disclosure may be implemented in modified forms without departing from an essential feature of the present disclosure. In addition, a scope of the present disclosure should be interpreted according to claims and includes various modifications, alterations, and equivalences made by those skilled in the art.

What is claimed is:

1. A multilayer capacitor comprising:
    a dielectric;
    external electrodes formed on both sides of the dielectric;
    first internal electrodes stacked in upper and lower regions of the dielectric, each first internal electrode includes a first connection section connected to the external electrodes and a first overlapped section, the first internal electrodes are alternately connected to the external electrodes, and the first internal electrodes are formed so that widths of the first connection sections are narrower than widths of the first overlapped sections that face up and down; and
    second internal electrodes stacked in a middle region positioned between upper and lower regions of the dielectric and alternately connected to the external electrodes, the second internal electrodes having second connection sections connected to the external electrodes and second overlapped sections that face up and down, wherein
        the external electrodes are electrically connected to the first and second connection sections of the first and second internal electrodes on the both sides of the dielectric,
        at least two first internal electrodes are stacked in an uppermost region of the dielectric and at least two first internal electrodes are stacked in a lowermost region of the dielectric, the uppermost and lowermost regions excluding cover layers,
        the widths of the first connection sections are narrower than the widths of the second connection sections,
        each of the first connection sections is connected to one of the external electrodes on one side or the other side of the dielectric, opposing each other in a length direction,
        pattern removing regions formed on at least two layers in upper and lower regions so as not to continuously vertically overlap each other in the upper and lower regions, each of the pattern removing regions is positioned on substantially the same level as each of the first connection sections and each of the first overlapped sections,
        each of the pattern removing regions is alternately formed between the one side or the other side of the dielectric where each of the first connection sections is connected thereto and each of the first overlapped sections, and
        a sum of widths of each of the first connection sections and each of the pattern removing regions is equal to a width of each of the first overlapped sections on substantially the same level.

2. The multilayer capacitor according to claim 1, wherein the widths of the first connection sections are narrower than the widths of the first overlapped sections by ¼ or more to ⅔ or less.

3. The multilayer capacitor according to claim 2, wherein the widths of the first connection sections are narrower than the widths of the first overlapped sections by ½.

4. An electronic device using the multilayer capacitor according to claim 1.

5. A method for manufacturing a multilayer capacitor, comprising:
    forming first internal electrode patterns on a plurality of first dielectric sheets so that widths of first connection sections of the first internal electrode patterns connected to external electrodes are narrower than widths of first overlapped sections of the first internal electrode patterns that face up and down;
    forming second internal electrode patterns on a plurality of second dielectric sheets having second connection sections connected to the external electrodes and second overlapped sections that face up and down;
    forming a stacked dielectric by stacking the plurality of the first dielectric sheets having the first internal electrode patterns formed thereon in upper and lower regions of the stacked dielectric so that the first connection sections are alternately disposed on both sides of the stacked dielectric and stacking the plurality of the second dielectric sheets having the second internal electrode patterns formed thereon in a middle region positioned between the upper and lower regions of the stacked dielectric so that the second connection sections are alternately disposed on both sides of the stacked dielectric; and
    forming the external electrodes on both sides of the stacked dielectric and alternately electrically connected to the first and second connection sections of the first and second internal electrode patterns on both sides of the stacked dielectric, wherein
        at least two of the first internal electrode patterns are stacked in an uppermost region of the stacked dielectric and at least two of the first internal electrode patterns are stacked in a lowermost region of the stacked dielectric, the uppermost and lowermost regions of the stacked dielectric excluding cover layers,
        the widths of the first connection sections are narrower than widths of the second connection sections, each of the first connection sections is connected to one of the external electrodes on one side or the other side of the dielectric opposing each other in a length direction, pattern removing regions formed on at least two layers in upper and lower regions so as not to continuously vertically overlap each other in the upper and lower regions, each of the pattern removing regions is positioned on substantially the same level as each of the first connection sections and each of the first overlapped sections, each of the pattern removing regions is alternately formed between the one side or the other side of the dielectric where each of the first connection sections is connected thereto and each of the first overlapped sections, and, and a sum of widths of each of the first connection sections and each of the pattern removing regions is equal to a width of each of the first overlapped sections on substantially the same level.

6. The method for manufacturing the multilayer capacitor according to claim 5, wherein in forming the first internal electrode patterns, the first internal electrode patterns are formed so that the widths of the first connection sections are in a range of approximately ⅓ to ¾ of those of the first overlapped sections.

\* \* \* \* \*